United States Patent
Jokiaho et al.

[11] Patent Number: 5,889,770
[45] Date of Patent: Mar. 30, 1999

[54] LOCATION UPDATING FOR A PACKET-SWITCHED DATA SERVICE IN A MOBILE COMMUNCIATION SYSTEM

[75] Inventors: Timo Jokiaho, Vantaa; Markku Rautiola; Jari Hämäläinen, both of Tampere; Jussi Rajala, Espoo, all of Finland

[73] Assignee: Nokia Telecommunicaitons Oy, Espoo, Finland

[21] Appl. No.: 718,512

[22] PCT Filed: Apr. 6, 1995

[86] PCT No.: PCT/FI95/00191

§ 371 Date: Oct. 4, 1996

§ 102(e) Date: Oct. 4, 1996

[87] PCT Pub. No.: WO95/28063

PCT Pub. Date: Oct. 19, 1995

[30] Foreign Application Priority Data

Apr. 8, 1994 [FI] Finland .................................. 941652

[51] Int. Cl.[6] ........................................................ H04Q 7/22
[52] U.S. Cl. .......................... 370/337; 370/338; 370/349; 455/433; 455/440; 455/456
[58] Field of Search ..................... 370/328, 329, 370/331, 337, 338, 347, 349, 389, 400, 409; 455/422, 432, 433, 435, 436, 440, 445, 450, 507, 517, 524

[56] References Cited

U.S. PATENT DOCUMENTS

| | | | |
|---|---|---|---|
| 5,260,987 | 11/1993 | Mauger | 455/433 |
| 5,400,390 | 3/1995 | Salin | 455/433 |
| 5,479,481 | 12/1995 | Koivunen | 455/422 |
| 5,557,655 | 9/1996 | Lantto | 455/433 |
| 5,561,840 | 10/1996 | Alvesalo et al. | 455/433 |
| 5,590,133 | 12/1996 | Billstrom et al. | 370/349 |
| 5,628,051 | 5/1997 | Salin | 455/433 |

FOREIGN PATENT DOCUMENTS

| | | |
|---|---|---|
| 366 342 | 5/1990 | European Pat. Off. . |
| 475 865 | 3/1992 | European Pat. Off. . |
| 566 407 | 10/1993 | European Pat. Off. . |
| 587 980 | 3/1994 | European Pat. Off. . |
| 630 166 | 12/1994 | European Pat. Off. . |

*Primary Examiner*—Alpus H. Hsu
*Attorney, Agent, or Firm*—Pillsbury Madison & Sutro LLP

[57] ABSTRACT

A location management method is provided for packet data transmission in a mobile communication system. To reduce the amount of signalling for location management concerning packet transmission compared to location management concerning normal traffic, location data of the mobile stations utilizing a data service is updated in a special data service user database. Packets to these mobile stations are sent via the cells as indicated by location data in that database. The database resides in a data service center which interfaces a data network.

14 Claims, 2 Drawing Sheets

LOCATION UPDATING FOR A PACKET-SWITCHED DATA SERVICE IN A MOBILE COMMUNCIATION SYSTEM

This application is the national phase of international application PCT/Fl95/00191 filed Apr. 6, 1995 which designated the U.S.

FIELD OF THE INVENTION

The present invention relates to a location management method for packet data transmission in a mobile communication system between a mobile station and a data service center establishing an interface to a data network, the method comprising the maintenance and updating of location data of the mobile station in a subscriber database of the cellular network in accordance with the location area configuration employed in the cellular network.

BACKGROUND OF THE INVENTION

In cellular radio systems, which are generally referred to as mobile communication systems herein, the geographical area covered by the system is divided into smaller radio areas, i.e. radio cells, to make the utilization of the frequency band of the system more efficient. Mobile radio stations, i.e. mobile stations, may freely move from a cell to another within the system area. In order that mobile-terminating calls and signalling can be routed to the correct location in a cellular radio network, the cellular radio network maintains the location data of mobile stations in the subscriber databases of the cellular radio network.

Typically, a cellular radio network knows the location of mobile stations with an accuracy of a so-called location area, which consists of one or more cells, (By this, it is meant that the cellular radio network knows which location area each mobile station is located in, but not necessarily in which cell within a location area each mobile station is located.) i.e. a group of cells. The location data of a mobile station in subscriber databases is updated only if the mobile station moves from a location area into another. This type of location updating based on a location area is a compromise between location updating carried out in each cell and PLMN-based (Public Land Mobile Network) location updating. The disadvantage of PLMN-based location updating is that in a case of a mobile-terminating call, the paging message is transmitted in all cells within the PLMN. Furthermore, all paging messages are repeated, for instance three times, to increase the probability of reception. This manner of proceeding consumes the frequency band. In a case where location updating takes place in connection with every cell crossover, there is a significant increase in the number of location updating messages. This consumes the capacity of the radio path, and the need for data processing in mobile services switching centers and base station controllers also increases.

The location updating and location management based on location areas operate in a satisfactory manner in conventional networks.

Finnish Patent Applications 933,894 and 940,314, which are unpublished on Apr. 8, 1994, disclose new packet data transfer modes between a mobile station and a special data service center. The packet service center produces an interworking function between the cellular radio network and a separate data network. Data packets are transmitted between a mobile station capable of data transmission and the packet service unit by using a so-called virtual connection. In this case, 1) a circuit-switched connection through the cellular network is only established for the period of time required for transmitting a single packet or 2) packets are transferred through the cellular radio network on the basis of the address on a data packet according to the node-to-node scheme entirely without a circuit-switched connection by using the network elements of the cellular network as nodes.

In the first case, described in Finnish Patent Application 933,894, the data service center informs a mobile station, via a common downlink paging channel, of an incoming data packet transmission, as a result of which the mobile station initiates the establishment of a circuit-switched connection in the network by using call set-up data associated with the virtual connection. When the packet transmission has been completed, the circuit-switched connection is immediately released and only the virtual connection, i.e. the switching data of the connection, is retained. Informing of incoming data transmissions takes place in cells via common paging channels by using paging messages. The number of paging messages relating to packet transmission in cells thus radically increases with the number of subscribers using the packet service and the amount of packet transmission. If the location management of a cellular network is based on location areas, a mobile station is informed of an incoming data transmission by transmitting a paging message in each cell of the location area. As a result of this, the consumption of the frequency band is greatly increased. If, however, location information is maintained in the cellular network with an accuracy of one cell, the transmission of multiple paging messages is avoided but on the other hand, the amount of location updating in the entire cellular network increases.

In datagram-based connectionless packet transmission, disclosed in Finnish Patent Application 940,314, there is no circuit-switched path between a mobile station and the packet service center during data transmission. On the radio path, data packets are primarily transmitted by using a dedicated media access control, derived from Aloha-type or other expedited call set-up signalling. Thus, it is also necessary in this other method to transmit paging or packet messages to a mobile station on paging channels in a case of an incoming packet transmission, whereby a similar conflict between the optimization of the number of paging messages and the amount of location updating arises.

SUMMARY OF THE INVENTION

The object of the present invention is to arrange location management relating to data packet transmission in a cellular network in such a manner that it is advantageous as regards both the normal operation of the network and packet data transmission.

This is achieved with a location management method, characterized according to the invention in that the method comprises the steps of:

registering a mobile station as a subscriber to a user database of a data service at the beginning of a virtual connection, maintaining and updating location data of the mobile station in the data service database with an accuracy of one cell or group of cells, and transmitting data packets and messages to the mobile station only via the cell or group of cells indicated by the location data contained in the data service user database.

The present invention also relates to an arrangement for location management in connection with packet data transmission in a mobile communication system comprising:

a mobile station, a mobile services switching center, at least one subscriber database, in which the location data of the mobile station is maintained and updated, a data service center, which establishes a data connection from the mobile communication network to a data network, and means for establishing a virtual packet data connection through the mobile communication network between the mobile station and the data service center.

The arrangement is characterized in that the arrangement comprises a data service subscriber database, in which a mobile station is registered at the beginning of a virtual packet data connection and in which the location data of the mobile station is maintained during the virtual packet data connection with an accuracy of one cell or group of cells.

The basic idea of the invention is to provide separate location management and location updating for packet data transmission in addition to the normal location management and location area configuration of a mobile communication system. The normal location management and location area configuration of the network are optimized for the normal use of the network as regards both the amount of location updating and paging signalling. In addition, according to the invention, other location data is maintained for mobile stations which use packet data service. This location management of the packet data service takes place with an accuracy of one cell or a group consisting of a few cells. When a mobile station desires to use the data service, it initiates the establishment of a virtual connection and is registered in a dedicated data service database. At the same time, the identity of the cell or group of cells within which the mobile station is currently located is stored in the data service database. When the mobile station moves from a cell or group of cells into another, the new location data is updated in the data service database. All paging messages and data packets relating to the data service are transmitted via the cell or group of cells determined by the location data of the data service, which results in a smaller amount of signalling in comparison with a case where the normal location area configuration of the cellular network is used. When the use of the packet service ends and the virtual connection is released, the registration of the mobile station in the data service database is removed and only the normal location management of the mobile communication network is performed on the mobile station. Accordingly, even though the location updating frequency of a single mobile station typically increases during the use of the data service, this increase in the amount of location updating is only temporary and is simultaneously directed to only a small number of mobile stations, the resulting increase in signalling being thus relatively low as regards the entire cellular network.

The extra signalling caused by location updating can be diminished by providing the data packets arriving at the data service center from a mobile station with the identifier of the cell or group of cells from which the mobile station transmitted them. The data service center compares the identifier of the cell or group of cells contained by the received data packet with a previous identifier stored in the data service database, and if it notices that the identifier has changed, it updates the location data of the mobile station in the database with the new identifier. This procedure makes it possible to significantly diminish or even entirely avoid the signalling relating to location updating during packet data transmission. The mobile station itself or the mobile communication network may insert the required identifier in a data packet before the data packet is transmitted to the data service center.

BRIEF DESCRIPTION OF THE DRAWINGS

In the following, the invention will be described by means of preferred illustrating embodiments with reference to the accompanying drawing, in which.

DETAILED DESCRIPTION OF PREFERRED EMBODIMENTS OF THE INVENTION

The present invention can be used in all digital mobile communication systems in which packet transmission according to Finnish Patent Application 933,894 or 940,314, or similar type of packet transmission, is applied. The invention can be used particularly advantageously in the pan-European digital mobile communication system GSM and in digital systems corresponding to it, such as DCS1800 and PCN. In the following, the preferred embodiments of the invention will be described as implemented in the GSM system, without restricting the invention to it, however.

As to the detailed structure and operation of the GSM system, the GSM recommendations of ETSI and the book "The GSM system for Mobile Communications", M. Mouly & M. Pautet, Palaiseau, France, ISBN:2-9507190-0-7, are referred to.

Figure 1:
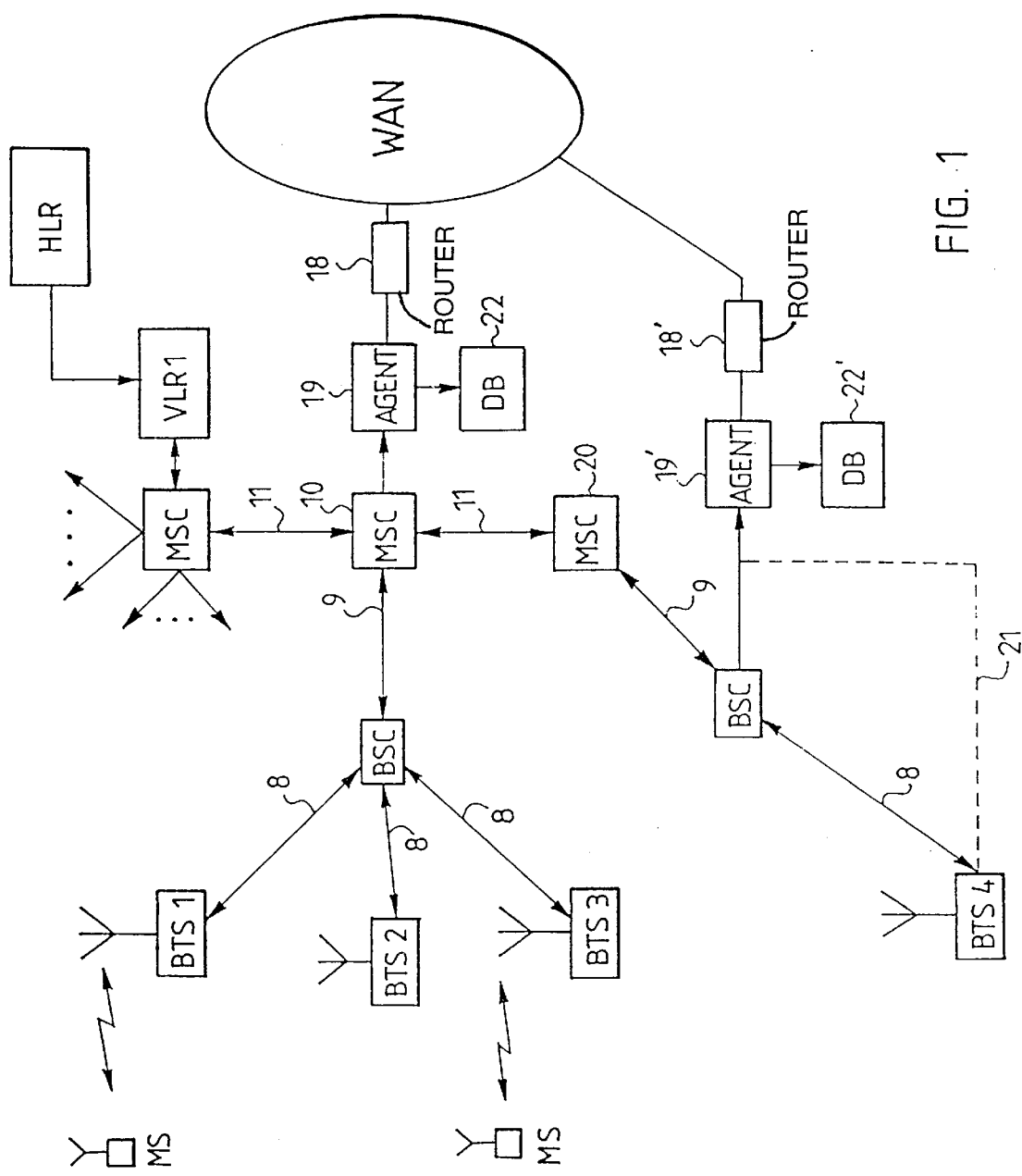
FIG. 1 illustrates a mobile communication network of the invention and its connection with data networks.

FIG. 1 shows a part of the GSM cellular radio system. In the cellular radio system, the area covered by the system is divided into radio cells. Base station systems BSS are connected to a mobile services switching center MSC by digital transmission links 9 (only two of these systems being shown in the figure for the sake of clarity). Each base station system BSS comprises a base station controller BSC, to which are further connected one or more base stations BTS by digital transmission links 8. Typically, the radio coverage area of one base station BTS forms one radio cell. Each base station BTS1–BTS4 is assigned a number of radio carriers. A signal in the GSM system consists of TDMA (Time Division Multiple Access) frames, each of which preferably contains eight time slots, by which logical channels are transferred. The logical channels include traffic channels for the calls (speech and data) set up with mobile radio stations MS located in a cell, and control channels for the signalling carried out with the mobile radio stations MS (mobile stations) located in a cell.

In the preferred embodiment of the invention shown in FIG. 1, a data service center AGENT 19 is also connected to the mobile services switching center MSC 10, the data service center being a process or a computer. The data service center is usually referred to as Agent. The data service center may be a new Interworking Functionality (IWF), which is intended for packet data, but it may also include other data functions in addition to the IWF. The location of the data service center in the network is not essential as regards the invention. The data service center may be connected to a mobile services switching center MSC, a base station controller BSC (like AGENT 19') or a base station BTS (like AGENT 19' by a dashed line 21). The operation of the data service center AGENT is fairly similar in all the alternatives. Packets from all mobile stations within a specified area are routed to the data service center, irrespective of the location of the data service center. The routing can be based on Signalling System 7, ATM, Internet, X.25, and so forth. In a normal case, the data service center AGENT handles all traffic at the next lowest hierarchical level. In the case of a data service center connected to a mobile services switching center MSC, the data service center controls mobile stations within the area of several base station controllers BSC connected to this mobile services switching center. A data service center connected to a base station controller BSC controls mobile stations within the area of one base station controller BSC and within the area of several base stations BTS connected to this base station controller. A data service center connected to a base station BTS handles the packet traffic of one base station BTS. However, it is possible that the data service center AGENT connected to the base-station controller BSC or the base station BTS also handles the packet traffic of mobile stations connected to other base station controllers. In this case, centralizing protocol is used between the base-station controllers BSC or the base stations BTS.

The purpose of the data service center AGENT is to provide advanced services without overloading the capacity of the mobile services switching center MSC or the base station controller BSC. The transmission of packets to and from the data service center is carried out in a transparent manner. The mobile services switching center MSC and the base station controller BSC route the packet data without handling it any further. The packets are opened and handled in the data service center only.

All data packets arriving from the mobile stations MS located in the service area of the data service center AGENT 19 are transmitted to it. In addition, a database DB 22 is connected to the data service center 19 for carrying out the location management of the mobile stations MS using the data service, as will be described in more detail below. One alternative to the separate database DB 22 is a corresponding database combined with the normal registers of a mobile communication system, for instance VLR and HLR in a GSM network. The AGENT 19 is thus provided with a link to such a register. In the preferred embodiment of the invention shown in FIG. 1, the data service center AGENT 19 is connected by a conventional router 18 to external data networks, such as a WAN (Wide Area Network). The service center AGENT 19 or AGENT 19' thus provides an interface between the mobile services switching center MSC 10, or correspondingly the base station controller BSC or the base station BTS, and external networks, such as a WAN.

A virtual connection according to Finnish Patent Application 933,894 may be established through the mobile communication network between a mobile station MS using the data service and the data service center, a circuit-switched connection between the mobile station MS and the service center AGENT 19 being thus established only for the period of time required for transmitting a data packet. With the use of this procedure, the operation and structure of the mobile communication network as regards packet data transmission are in accordance with Finnish Patent Application 933,894, which is incorporated herein by reference.

In a second embodiment of the invention, packet data transmission between the service center AGENT 19 and base stations BTS through the mobile communication network takes place, without a circuit-switched connection, according to the node-to-node scheme by means of the address contained by a data packet in a manner disclosed in Finnish Patent Application 940,314, which is incorporated herein by reference. On the radio path, data packets are transmitted on a dedicated radio channel by using a new type of media access control, derived from Aloha-type or other expedited call set-up signalling. An example of this type of media access control suitable for packet data transmission is disclosed in Finnish Patent Applications 923,667, 923,668 and 923,669, which are incorporated herein by reference.

However, it should be noticed that the location management of the present invention is highly independent of the packet data transmission procedure used in the mobile communication network, except that a virtual connection should be connected with the packet data transmission, this virtual connection requiring a mobile station to be paged on common paging channels on the radio path.

In the following, the present invention will be described by using as an example a datagram-based transfer method in a GSM network, this method being in accordance with Finnish Patent Application 940,314, i.e. there is no circuit-switched path established between a mobile station MS and the packet service center AGENT 19 during data transmission.

In the mobile communication network of the invention, data-on the location of the mobile station MS is maintained in subscriber databases, in accordance with the location area configuration determined in the network, so as to enable the routing of incoming calls to the mobile station by normal network procedures, or to page the mobile station for some other reason. This normal location management and location updating of the mobile communication network also relate to those mobile stations MS which are currently using the data service provided with dedicated location management according to the invention. Typically, a cellular network knows the location of mobile stations MS with an accuracy of a larger area consisting of several cells, this area being generally referred to as a location area.

Figure 2:
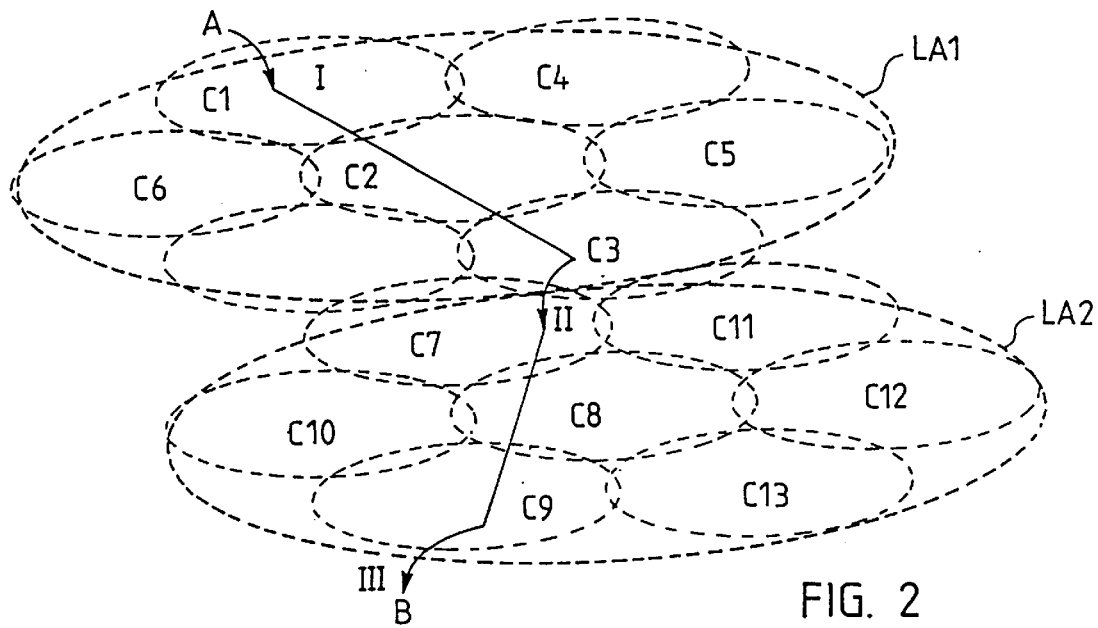
FIG. 2 illustrates the normal location updating procedure of a mobile communication network.

The normal location updating of a cellular network is illustrated in FIG. 2, which shows two location areas LA1 and LA2 with cells C1–C6 and C7–C13, respectively. The base stations of the cellular network constantly broadcast information on themselves and their neighborhood, for instance location area identifiers LAI, base station identifiers BSI, base station type identifiers BSTI, etc. A mobile station MS registered in a cell knows which location area the base station BTS belongs to on the basis of the location area identifier broadcast by the base station BTS. If the MS observes that the location area identifier LAI changes when the base station BTS is changed, i.e. that the location area LA changes, the MS initiates location updating by transmitting a location updating request to the cellular radio network. In FIG. 2, the change of location area and location updating take place on route A-B at points I, II and III. If the location area is not changed, the MS does not perform location updating. This is the case for instance on transition from cell C2 to cell C3 within location area LA1.

The location updating causes the subscriber information of the MS to be updated in the subscriber database of the cellular radio network. For instance in the mobile communication system illustrated in FIG. 1, the location area information of a mobile station MS is stored in a visitor location register VLR, of which there are typically one for each mobile services switching center MSC. In addition, the mobile communication network comprises one centralized subscriber register, a home location register HLR, which is aware of the VLR within the area of which the MS is located. When the mobile station MS is to be paged for some reason, the corresponding location area information is retrieved from the visitor location register VLR, and the mobile station MS is paged in each cell of the location area concerned.

Figure 3:
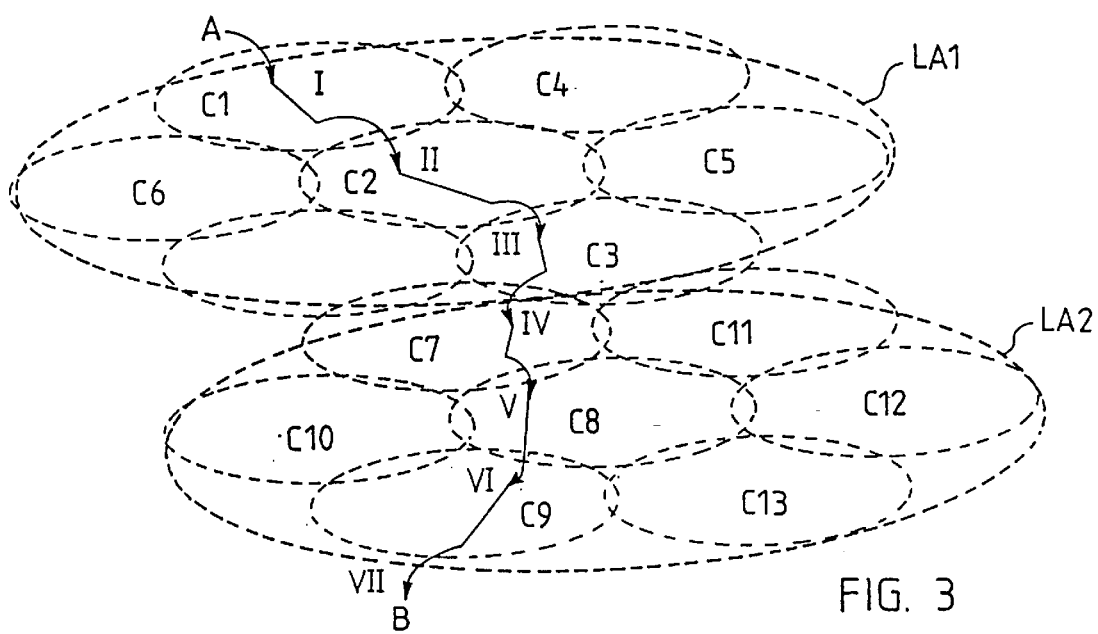
FIG. 3 illustrates the data service location updating according to the invention.

In accordance with the invention, other location information is maintained for the mobile stations MS which are using the packet data service, for instance in the data service database 22 located in connection with the data service center 19, or as a part of the normal subscriber database. If the system comprises several data services, it is possible to maintain dedicated location area information for each service, if required. The normal location updating in a mobile communication network described in connection with FIG. 2 is, however, simultaneously performed on the mobile station MS using the data service. In the preferred embodiment of the invention, the location management of the data service is based on location updating taking place in connection with each crossover. This is illustrated in FIG. 3. Alternatively, the location management of the data service may employ "location areas", which include several cells.

With reference to FIG. 3, when the mobile station using the data service travels the route from location A to location B as shown in FIG. 2, it performs location updatings I–VII shown in FIG. 3 into the database 22 of the data service center during every cell crossover in addition to performing the normal location updatings of FIG. 2. When data packets or paging messages relating to packet data transmission are transmitted to the mobile station MS in the downlink direction (mobile station MS-terminating transmissions), they are only transmitted in the cell indicated by the location data contained by the database 22 instead of the entire location area LA1 or LA2. If the mobile station MS is not using the packet data service, only the normal location updating according to FIG. 2 is performed on it on route A-B.

In the following, the location updating of the invention will be described in more detail from beginning to end. The mobile station MS desiring to use the datagram-based method in a mobile communication network registers in that data service center AGENT 19 which serves the area within which the mobile station is located at that particular moment. The service center 19 registers the mobile station MS in its database 22 as one customer located within the service area of the service center. At the moment of registration, the data service center AGENT 19 assigns the mobile station a mobile station identifier. This identifier is unique within the entire service area of the service center. The mobile station identifier is used in every packet leaving from and terminating at a mobile station for identifying the transmitting and, correspondingly, the receiving mobile station. In the mobile-terminating direction, this identifier can be used on the common calling channel for identifying the destination of a packet. At the registration stage, there is also an exchange of ciphering keys which are used in the packets transmitted subsequently. During the virtual connection established in this manner, the mobile station MS is able to use the datagram-based transfer method.

Location updating information is transmitted to the service center AGENT 19 every time the mobile station MS crosses the boundary between two cells. In the preferred embodiment of the invention, the location information in the database 22 of the data service is based on the accuracy of one cell, i.e. the smallest geographical area possible. This is a way of decreasing the number of packets transmitted unnecessarily to the cells. The mobile station MS is registered in the direction of the service center AGENT 19 by transmitting a location updating control packet. In this packet, the mobile station MS transmits its identifier, and the control field indicates to the service center 19 an incoming control packet. The relaying mobile communication network element, such as a base station controller BSC, adds to the location updating control packet the identifier of the cell from which the packet was received, and transmits the packet further to the service center AGENT 19. AGENT 19 uses this cell identifier for location updating purposes by comparing it with the current location data of the mobile station MS in the database 22 and by updating the location data of the mobile station MS in the database 22 if the received identifier and the stored identifier differ from each other. The mobile station MS recognizes the need for a cell crossover by monitoring the broadcast carrier of the cell. In present-day cellular systems, such as the GSM, a common channel exists for transmitting control information to mobile stations. By monitoring this channel, the mobile station MS is able to decide on the necessity for a cell crossover.

In present-day cellular systems, handover functions are mainly carried out by the network infrastructure. A slight degree of decentralization has been achieved by allowing mobile stations to measure the quality of a channel and to transmit measuring reports to the network infrastructure.

The mobile station MS using the packet data service monitors the control channels of the mobile communication network and makes an independent decision on location updating. An algorithm especially intended for the location updating of the data service is used in the decision-making. This algorithm can be based for instance on the level of a signal received by the mobile station, the quality of a signal (for instance the bit error rate), other corresponding criteria or the different combinations thereof. In order to prevent back-and-forth location updatings between two cells in their boundary area, the criteria used in decision-making are determined in such a manner that there is hysteresis in the boundary areas of the cells during location updating, i.e. the location updating criteria from a cell to another are different in one direction than in the opposite direction. The location updating can alternatively be carried out every time the mobile station MS performs a cell crossover or handover in the mobile communication network according to the normal procedures of the mobile communication network.

Figure 4:
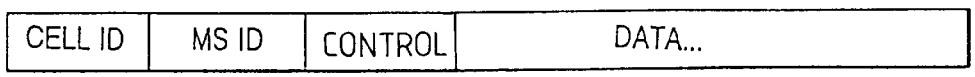
FIG. 4 shows a packet format, used between a base station controller and a packet handling center.
Figure 5:
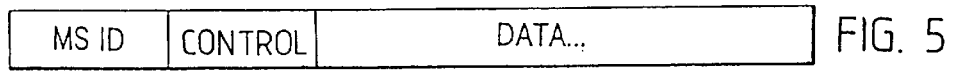
FIG. 5 shows a packet format, used between a base station and a base station controller.

If a mobile station has data to be transmitted when it is crossing a cell boundary, the mobile station transmits a normal information packet after the connection with the new cell has been established. The data packets transmitted between the mobile station MS and the packet service center AGENT 19 consist of a mobile station identifier MS ID, a possible control information field CONTROL, and a data field DATA, as illustrated in FIG. 5. If the data service center is connected with a mobile services switching center MSC, as the data service center AGENT 19, the base station system, usually the base station controller BSC, adds to the data packet, such as shown in FIG. 5, received from the mobile station MS the cell identifier of the cell from which the data packet was received, and forwards the resulting data packet, such as shown in FIG. 4, to the data service center AGENT 19. Correspondingly, when the data service center, such as the AGENT 19', is connected with a base station controller, the base station controller provides the data packet to be transmitted to the data service center with the cell identifier CELL ID of the cell from which the packet was received. If the packet service center is connected directly to a base station BTS, as AGENT 19 by the dashed line 21, the situation may be slightly different. In this case, the mobile station MS provides the data packet with a cell identifier CELL ID and transmits the data packet according to FIG. 4. The mobile station is informed of which base station it is registered in by system information transmitted on common downlink control channels.

When the data service center AGENT 19 receives the data packet according to FIG. 4, it compares the cell information CELL ID contained by the data packet with the location data of the mobile station MS stored in the data service database 22, this location data also being a cell identifier CELL ID. If the received cell identifier is different, the data service center updates the location data of the mobile station MS in the database 22 with this new cell identifier. With this updating method based on the cell identifier in a data packet, it is possible to avoid the transmission of separate updating control messages and thus to save frequency band on the radio interface as well as the data processing capacity required by the data service center AGENT 19.

As an additional aspect, the invention may comprise a location updating acknowledgement transmitted by the data service center AGENT 19. If the mobile station MS does not receive the acknowledgement, it repeats the location updating. By means of the acknowledgement procedure, it is possible to prevent the possibility that the location updating performed by the mobile station MS will be ignored by the data service center 19, for instance due to a transmission error, in which case the subsequent packets intended for the mobile station would be transmitted to a wrong cell according to the previous location data. The loss of data packets during location updating and cell crossover can further be prevented in such a manner that the mobile station MS transmits a message to the service center 19 at the beginning of a crossover, which message indicates that the mobile station is not ready to receive data packets. When the cell crossover has been performed, the mobile station MS indicates to the service center 19 by another message that the packet transmission can continue. Of course, this procedure is only used if the cell crossover is performed within the area of the same service center 19. After the cell crossover, the mobile station MS can also indicate which data packet it has received last, whereby the service center 19 is able to continue the transmission with the correct data packet. However, it is possible, if required, to omit the acknowledgement procedure in the case described above, in which the location updating is transmitted with the data packet. In this case, the upper level protocol related to packet transmission handles the retransmission of a data packet in any case if it is lost for some reason. If the data service center AGENT 19 does not thus receive an acknowledgement of some data packet or a group of data packets, one reason for this may be the erroneous location information of the mobile station. After having performed a predetermined number of unsuccessful transmission attempts to the cell indicated by the location data in the database 22, the data service center 19 may transmit the data packet within a larger area, such as the entire location area, and wait for an acknowledgement again. In the acknowledgement message transmitted by the mobile station MS, the mobile station identifier MS ID and the cell identifier CELL ID indicate to the data service center the current location of the mobile station. The data service center AGENT 19 updates this new location to the database 22 and continues to transmit the packets intended for the mobile station only to the cell indicated by this location data.

The virtual connection can be terminated by the mobile station if there is no more data to be transmitted. The mobile station thus transmits a virtual channel termination packet to the data service center 19, as a result of which all the information relating to this mobile station in the database 22 of the data service is removed.

In a case where the mobile station MS moves into the area of another data service center AGENT 19, the virtual connection with the current data service center is terminated, and the new virtual connection is established immediately with the new data service center.

To optimize the power consumption of a mobile station, the normal paging of the mobile communication network may be combined with packet data paging. The packet data paging is a quick way of delivering the data packets addressed to a mobile station. When the mobile station is not expecting packet traffic, it can enter a power saving mode. In this state, it listens to the paging channel less frequently than in the normal operation state. Due to the logic channel structure, it is possible to transmit paging time slots less frequently, whereby it is not necessary for the mobile station to monitor paging messages as often as in the normal state. On the other hand, the packet data paging can be combined with the call paging of the mobile communication network. The mobile station thus listens to the normal paging channel only and receives the data packets and calls addressed to it.

The size of the groups of cells used in data service location updating may be different for different packet data services. For instance with services in which the number of transmissions and receptions in a time unit is high, the updating may take place within the area of one cell or a few cells. With services in which the number of transmissions and receptions in a time unit is low, a larger group of cells can be used in location updating. The size of the area used in location updating may also vary according to mobile stations, for instance a mobile station 1 may have a different updating area structure than a mobile station 2.

The figures and the description relating thereto are only intended to illustrate the present invention. In their details, the location management method and arrangement of the invention may vary within the scope of the appended claims.

We claim:

1. A location management method for packet data transmission in a mobile communication system between a mobile station and a data service center establishing an interface to a data network, said method comprising the steps of:

maintaining and updating location data of the mobile station in a subscriber database of a cellular network of the mobile communication system in accordance with a location area configuration employed in the cellular network and including one cell or a group of cells, within an accuracy of one cell or group of cells;

registering the mobile station as a subscriber to a user database of the data service center at the beginning of a virtual connection; and transmitting data packets and messages to the mobile station only via the cell or group of cells indicated by the location data contained in said data service user database.

2. The method according to claim 1, wherein said maintaining and updating comprises:

transmitting a location updating message from the mobile station to the data service center every time the mobile station crosses a boundary between two cells or groups of cells of said mobile communication system, said location updating message containing an identifier of a respective new cell or group of cells of said mobile communication system; and updating the location data of the mobile station in said data service subscriber database with said identifier contained in said location updating message.

3. The method according to claim 1, wherein said maintaining and updating comprises:

transmitting a location updating message addressed to the data service center from the mobile station every time the mobile station crosses a boundary between two cells or groups of cells of said mobile communication system;

adding to said location updating message at a base station, base station controller or mobile services switching center of the mobile communication system an identifier of a respective cell or group of cells of said mobile communication system from which said location updating message was received; and transmitting said location updating message provided with said identifier to the data service center, and updating the location data of the mobile station in said data service user database with said identifier contained by said location updating message.

4. The method according to claim 2, wherein said maintaining and updating comprises:

transmitting an acknowledgement from the data service center to the mobile station when the location data of the mobile station in said data service user database is updated with the identifier contained by said location updating message.

5. The method according to claim 1, wherein said maintaining and updating comprises:

transmitting a normal data packet from the mobile station to the data service center immediately after moving into a new cell or group of cells;

adding to said data packet at a base station, base station controller or mobile services switching center of the mobile communication system an identifier of a respective cell or group of cells of said mobile communication system from which said data packet was received;

transmitting said data packet provided with said identifier to the data service center;

observing at the data service center that said identifier of the respective cell or group of cells contained by the received data packet is different than the location data of the mobile station presently existing in the data service user database; and updating the location data of the mobile station in the data service user database with said identifier contained by the received data packet, as a new identifier therefor.

6. The method according to claim 1, wherein said maintaining and updating comprises: after effecting a crossover of a boundary between two cells of said mobile communication system, the mobile station reporting to the data services center of which data packet it has received last before having effected said crossover, as a reported data packet; and said transmitting includes the data service center continues said transmitting from a data packet subsequent to said reported data packet.

7. The method according to claim 1, wherein said maintaining and updating comprises:

at the beginning of effecting a crossover of a boundary between two cells of said mobile communication system, the mobile station transmits a message to the data service center, which message indicates that the mobile station is not ready to receive data packets; and after effecting said crossover, the mobile station transmitting a message to the data service center, which message indicates said transmitting of data packets can continue.

8. The method according to claim 1, further comprising:

the mobile station enters a power saving mode when not expecting to be receiving data packets; and the mobile station monitoring a paging channel of said cellular network less frequently when in said power saving mode than when in a normal operation state corresponding to expecting to be receiving data packets.

9. The method according to claim 1, further comprising:

the mobile station monitoring a normal call paging channel only and receiving the data packets and calls addressed to said normal call paging channel.

10. The method according to claim 1, wherein:

each said location area includes a respective group of cells, the number of the cells of each said group of cells being mobile station-specific, data service-specific and/or dependent on the amount of data packet traffic directed to the mobile station.

11. An arrangement for location management in connection with packet data transmission in a mobile communication system, comprising:

a mobile station;

a mobile services switching center;

at least one subscriber database in which location data as to location of the mobile station is maintained and updated;

a data service center which is arranged to establish a data connection from the mobile communication network to a data system;

means for establishing a virtual packet data connection through a the mobile communication system, between the mobile station and the data service center;

a data service subscriber database arranged to have the mobile station registered therein at the beginning of a virtual packet data connection and to have location data as to location of the mobile station maintained therein during the virtual packet data connection, with an accuracy of one cell or group of cells of said mobile communication system.

12. The arrangement according to claim 11, wherein:

said mobile communication system comprises means which add, at a base station, base station controller or mobile services switching center of said mobile communication system, to a data packet received from the mobile station an identifier of a respective cell or group of cells from which the data packet was received, and transmit said data packet, provided with said identifier, to said data service center; and said data service center comprising means which, in response to said identifier of the cell or group of cells contained in the said data packet being different from the location data as to location of the mobile station existing in the data service center database, update the location data as to location of the mobile station in the data service subscriber database with said identifier contained said data packet.

13. The arrangement according to claim 11, wherein:

the data service center comprises means for transmitting an acknowledgement to the mobile station when the location data as to location of the mobile station in said data service subscriber database is updated.

14. The arrangement according to claim 11, wherein:

the data service center is connected with a base station, base station controller or mobile services switching center of the mobile communication system.

* * * * *